(12) United States Patent
Oh et al.

(10) Patent No.: US 11,541,876 B2
(45) Date of Patent: Jan. 3, 2023

(54) ELECTRONIC STABILITY CONTROL METHOD FOR VEHICLE

(71) Applicants: HYUNDAI MOTOR COMPANY, Seoul (KR); KIA MOTORS CORPORATION, Seoul (KR)

(72) Inventors: Ji Won Oh, Hwaseong-si (KR); Jeong Soo Eo, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 327 days.

(21) Appl. No.: 16/907,746

(22) Filed: Jun. 22, 2020

(65) Prior Publication Data

US 2021/0171017 A1  Jun. 10, 2021

(30) Foreign Application Priority Data

Dec. 5, 2019 (KR) .................. 10-2019-0160284

(51) Int. Cl.
*B60W 30/045* (2012.01)
*B60W 40/105* (2012.01)
(Continued)

(52) U.S. Cl.
CPC ......... *B60W 30/045* (2013.01); *B60K 17/354* (2013.01); *B60W 10/04* (2013.01);
(Continued)

(58) Field of Classification Search
CPC .... B60W 30/045; B60W 10/04; B60W 10/18; B60W 30/18172; B60W 40/068;
(Continued)

(56) References Cited

U.S. PATENT DOCUMENTS

| 4,896,738 A * | 1/1990 | Kodama ............ B60K 17/3462 |
| | | 180/247 |
| 2004/0158377 A1* | 8/2004 | Matsumoto ........... B60W 10/06 |
| | | 701/70 |

(Continued)

FOREIGN PATENT DOCUMENTS

| JP | 2006327367 A | * 12/2006 |
| KR | 1016261630000 B | 5/2016 |
| KR | 20170047042 A | 5/2017 |

*Primary Examiner* — Dale W Hilgendorf
*Assistant Examiner* — Frank T Glenn, III
(74) *Attorney, Agent, or Firm* — McDonnell Boehnen Hulbert & Berghoff LLP

(57) ABSTRACT

The present disclosure provides an electronic stability control method for a vehicle for performing vehicular electronic stability control simply by adjusting driving force and braking power that are generated by a driving device of the vehicle without use of a driving force distributing method between front, rear, left, or right vehicle wheels. To this end, the vehicular electronic stability control method includes determining a vehicular state value indicating a driving state of a vehicle from information collected from the vehicle, comparing the determined vehicle state value with a first reference value, and controlling an operation of a driving device for generating driving force for driving the vehicle by the controller when the vehicle state value is greater than the first reference value to adjust driving force for preventing understeer or oversteer of the vehicle.

19 Claims, 4 Drawing Sheets

(51) Int. Cl.
*B60W 40/114* (2012.01)
*B60K 17/354* (2006.01)
*B60W 10/18* (2012.01)
*B60W 10/04* (2006.01)
*B60W 30/18* (2012.01)
*B60W 40/068* (2012.01)

(52) U.S. Cl.
CPC ...... *B60W 10/18* (2013.01); *B60W 30/18172* (2013.01); *B60W 40/068* (2013.01); *B60W 40/105* (2013.01); *B60W 40/114* (2013.01); *B60W 2520/14* (2013.01); *B60W 2520/26* (2013.01)

(58) Field of Classification Search
CPC ............. B60W 40/105; B60W 40/114; B60W 2520/14; B60W 2520/26; B60K 17/354
See application file for complete search history.

(56) References Cited

U.S. PATENT DOCUMENTS

| | | | | |
|---|---|---|---|---|
| 2005/0103551 A1* | 5/2005 | Matsuno | ......... | B60W 30/18127 180/243 |
| 2007/0088484 A1* | 4/2007 | Fujita | .............. | B60W 30/18145 701/41 |
| 2007/0162203 A1* | 7/2007 | Yasutake | ............... | B60W 30/04 701/1 |
| 2009/0198413 A1* | 8/2009 | Miller | ................... | B60W 50/08 701/37 |
| 2016/0272067 A1* | 9/2016 | Trönnberg | .............. | B60L 3/106 |
| 2018/0345924 A1* | 12/2018 | Berels | ..................... | B60T 8/175 |

\* cited by examiner

ELECTRONIC STABILITY CONTROL METHOD FOR VEHICLE

CROSS-REFERENCE TO RELATED APPLICATION

This application claims under 35 U.S.C. § 119(a) the benefit of priority to Korean Patent Application No. 10-2019-0160284 filed on Dec. 5, 2019, the entire contents of which are incorporated herein by reference.

BACKGROUND

(a) Technical Field

The present disclosure relates to an electronic stability control method for a vehicle, and more particularly, to an electronic stability control method for a vehicle for performing vehicular electronic stability control simply by adjusting driving force and braking power that are generated by a driving device of the vehicle without use of a driving force distributing method between front, rear, left, or right vehicle wheels.

(b) Background

In order to control and ensure the stability of a vehicle while the vehicle travels, it is important to accurately determine and predict understeer or oversteer of the vehicle and to then perform effective and immediate control for countermeasure thereof.

An understeer and oversteer phenomenon while a vehicle turns is the largest cause for reducing stability, and the most strong control device for overcoming the problem is an electronic stability program (ESP).

The ESP applies braking power to an internal rear wheel of the vehicle that turns during understeer and applies braking power to an external front wheel of the vehicle that turns during oversteer to ensure yaw stability, which is based on a principle whereby additional braking force is applied to an axis having sufficient grip force on a friction circle to form a braking moment and yaw of the vehicle is controlled through the braking moment.

However, the ESP is operated using frictional braking power (i.e., hydraulic braking power), and thus is frequently ineffective during a control operation thereof.

Thus, research has been conducted into a vehicular electronic stability control technology using a regenerative brake, but in order to embody differential braking for each vehicle wheel using a regenerative brake, in-wheel motor or left or right independent type motors, or left or right vehicle wheel driving force or braking force distribution device are required, which increases manufacturing costs.

Recently, research has been conducted into a technology of controlling the stability of a vehicle through distribution of a driving force between front and rear vehicle wheels, but not distribution of the driving force between left and right vehicle wheels, but there is a limit in that a driving device for driving the vehicle needs to be installed at the front wheel and the rear wheel.

Thus, there is a need for a vehicular electronic stability control technology using only driving force and braking power irrespective of a type of a single axle vehicle and an electronic-4 wheel drive (e-4WD) that is an eco-friendly 4-wheel driving vehicle.

SUMMARY OF THE DISCLOSURE

The present disclosure has been made in an effort to solve the above-described problems associated with prior art.

In one aspect, the present disclosure provides an electronic stability control method for a vehicle for performing vehicular electronic stability control simply by adjusting driving force and braking power that are generated by a driving device of the vehicle without use of a driving force distributing method between front, rear, left, or right vehicle wheels.

In a preferred embodiment, an electronic stability control method for a vehicle includes collecting information for determining a vehicle state value while the vehicle travels, by a controller of the vehicle, determining the vehicle state value indicating a driving state of the vehicle from the collected information, by the controller, comparing the determined vehicle state value with a first reference value, by the controller, and when the vehicle state value is greater than the first reference value, controlling an operation of a driving device for generating driving force for driving the vehicle and adjusting driving force for preventing understeer or oversteer of the vehicle, by the controller, wherein the vehicle state value is a yaw rate error or is a slip angle difference value between a front wheel or a rear wheel, and wherein the first reference value is a first error reference value determined by a current vehicle speed by the controller.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

DETAILED DESCRIPTION

Figure 1:
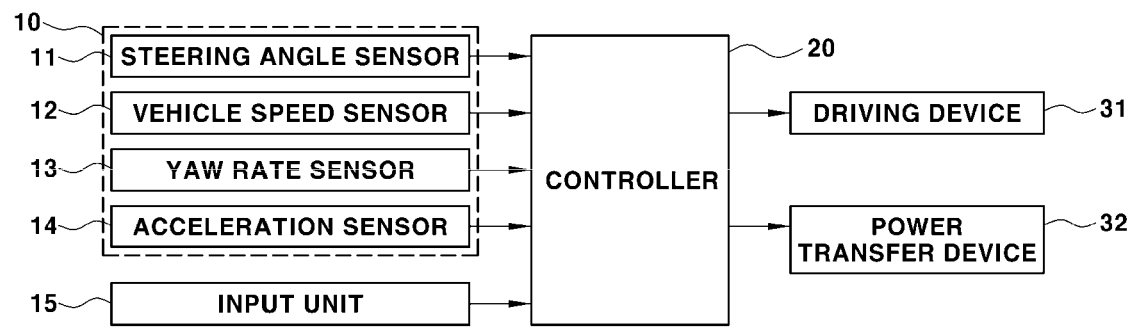
FIG. 1 is a block diagram illustrating the configuration of an apparatus for performing a vehicular electronic stability control procedure according to the present disclosure.

Exemplary embodiments of the present disclosure are described in detail so as for those of ordinary skill in the art to easily implement the present disclosure with reference to the accompanying drawings. However, the present disclosure may be implemented in various different forms and is not limited to these embodiments.

In the specification, when a certain part "includes" a certain component, this indicates that the part may further include another component instead of excluding another component unless there is no different disclosure.

The present disclosure provides a method of controlling the stability of a vehicle by adjusting driving force and braking power generated by a driving device of a vehicle rather than distributing driving force between front, rear, left, or right vehicle wheels.

The method of controlling the stability of the vehicle according to the present disclosure may be applied to an electric motored freight car, and the electric motored freight car refers to a vehicle driven by a motor, that is, a motor driven vehicle including a motor as a driving device for driving the vehicle.

The electronic stability control method according to the present disclosure may also be applied to a general engine (an internal combustion engine) vehicle.

The electronic stability control method according to the present disclosure may be applied to both a single axle vehicle having one driving device and an e-4WD vehicle having respective separate driving device for front and rear wheels.

Here, the single axle vehicle may be a vehicle using an engine or a motor as a driving device for driving the vehicle and may be a front wheel drive vehicle configured to apply driving force to the front wheel by a driving device or a rear wheel drive vehicle configured to apply driving force to the rear wheel by the driving device.

The e-4WD vehicle may be a vehicle including a rear wheel motor for selecting applying driving force and braking power (regenerative braking power) to a rear wheel as a rear wheel driving device, and in this case, a front wheel driving device may be an engine or a motor.

In the electronic stability control method according to the present disclosure, vehicular electronic stability control may be performed based on weight transfer according to a vehicle behavior.

When driving force is applied to a vehicle wheel, weight transfer may occur in a side of a rear wheel, and thus normal load at the front wheel may be reduced but normal load at the rear wheel may be increased.

In contrast, when braking power is applied to a vehicle wheel, weight transfer may occur in a side of the front wheel, and thus normal load at the front wheel may be increased but normal load at the rear wheel may be reduced.

Understeer of the vehicle refers to a state in which lateral grip force of the front wheel is less sufficient than lateral grip force of the rear wheel and a slip angle of the front wheel is larger than a slip angle of the rear wheel.

In contrast, oversteer of the vehicle refers to a state in which lateral grip force of the rear wheel is less sufficient than lateral grip force of the front wheel and a slip angle of the rear wheel is larger than a slip angle of the front wheel.

Thus, in order to prevent understeer of the vehicle, weight transfer toward a side of the front wheel needs to be performed, and in order to prevent oversteer of the vehicle, weight transfer toward a side of the rear wheel needs to be performed.

The present disclosure provides vehicular electronic stability control using the aforementioned points, and when a current situation is determined to be a situation in which understeer or oversteer of the vehicle occurs, driving force or braking power applied to the front wheel or the rear wheel may be controlled to prevent or alleviate the understeer or oversteer phenomenon.

The electronic stability control method may be a slip angle-based electronic stability control method that requires separate slip angle information of the front wheel and the rear wheel, and in this regard, whether the method is applied may be determined depending on a type of a sensor provided in a vehicle.

Thus, the present disclosure may also propose a yaw rate-based electronic stability control method but not a slip angle-based control method.

That is, the electronic stability control method according to the present disclosure may include both the slip angle-based electronic stability control procedure and the yaw rate-based electronic stability control procedure, and in this case, the yaw rate-based electronic stability control procedure may be performed by moving priority of an axial friction circle to a lateral direction from a longitudinal direction, but not based on weight transfer.

That is, the present disclosure may include a method of controlling the stability of a vehicle by controlling driving force to acquire a lateral-direction behavior of the vehicle even if vehicle driving (acceleration) performance is sacrificed in the case of a dangerous situation.

FIG. 1 is a block diagram illustrating the configuration of an apparatus for performing a vehicular electronic stability control procedure according to the present disclosure. The electronic stability control apparatus may include a detector 10 for detecting vehicle state information through a sensor installed in a vehicle, a controller 20 for determining the state of the vehicle based on the vehicle state information detected by the detector 10 and controlling a state of applying driving force or braking power to a vehicle wheel depending on the determined state of the vehicle, and a vehicle driving device 31 controlled according to a driving force command output from the controller 20.

In addition, the electronic stability control apparatus may further include an input unit 15 for turning on/off an electronic stability control function by a driver.

According to such configuration of the electronic stability control apparatus, when the driver turns on the stability through the input unit 15, the controller 20 may determine an on-state of the electronic stability control function and may then perform the electronic stability control procedure according to the present disclosure under control of the controller 20.

The electronic stability control apparatus may further include a power transfer device 32 for transferring driving force generated by a driving device 31 for driving the vehicle to a corresponding vehicle wheel.

The power transfer device 32 may be a device for connection between the driving device 31 and a vehicle wheel to transfer power therebetween or disconnection between the driving device 31 and the vehicle wheel to disconnect power therebetween according to a control signal output from the controller 20, and may be a clutch or the like that is installed on a power transfer path between the driving device 31 and the vehicle wheel.

Among the aforementioned components of the electronic stability control apparatus, the detector 10 may include a steering angle sensor 11 for detecting a steering angle, a vehicle speed sensor 12 for detecting a vehicle speed, and a yaw rate sensor 13 for detecting a yaw rate of a vehicle.

The steering angle sensor 11 may be a sensor for detecting a steering angle (a column input angle, i.e., a steering angle of a steering wheel manipulated by the driver) according to manipulation of the steering wheel of the driver, and the controller 20 may estimate and acquire steering angle information of a vehicle wheel (tire), at which manipulation is performed, from a signal of the steering angle sensor 11.

The vehicle speed sensor 12 may be a wheel speed sensor that is installed in a front wheel, a rear wheel, or the like and detects a rotation speed of the corresponding vehicle wheel, and may acquire a vehicle speed from a single of a wheel speed sensor installed in each vehicle wheel in a general vehicle.

Acquisition of vehicle speed information that is a longitudinal-direction speed of a vehicle from wheel speed information detected by the wheel speed sensor is a known technology, and thus a detailed description thereof will be omitted here.

In addition, according to the present disclosure, the detector 10 may further include an acceleration sensor 14, and here, the acceleration sensor 14 may be a lateral-acceleration sensor, and lateral acceleration detected by the lateral-acceleration sensor may be used to acquire a lateral slip angle as described below.

According to the present disclosure, the lateral slip angle may be used to calculate a front wheel slip angle and a rear wheel slip angle during the slip angle-based electronic stability control procedure.

The controller 20 may determine an on/off state of the electronic stability control function, may determine a vehicle speed condition for preventing a malfunction at a low speed, and may determine the state of the vehicle based on vehicle state information detected by the detector 10.

The controller 20 may control the state in which driving force is applied to a vehicle wheel depending on the determined state of the vehicle, and in this case, control of reducing driving force transferred to the vehicle wheel may be performed, or control of blocking driving force with respect to the vehicle wheel may be performed. According to the present disclosure, when controlling the state in which driving force is applied to the vehicle wheel, the controller 20 may correct a general driving force command determined based on driving information of the vehicle, based on vehicle state information.

In this case, the controller 20 may determine a driving force correction coefficient based on the vehicle state information detected by the detector 10 and may then correct the driving force command using the determined driving force correction coefficient to generate a final driving force command.

Thus, when the controller 20 outputs the corrected final driving force command, the driving device 31 for driving the vehicle may be controlled according to the driving force command output by the controller 20 to control the driving force generated by the driving device 31, that is, driving force applied to the corresponding vehicle wheel.

An operation of the power transfer device 32 may be controlled according to the control signal output from the controller 20 to block power transfer between the driving device 31 and the corresponding vehicle wheel.

The power transfer device 32 may be an engine or a motor for driving the vehicle as described above.

Figure 2:
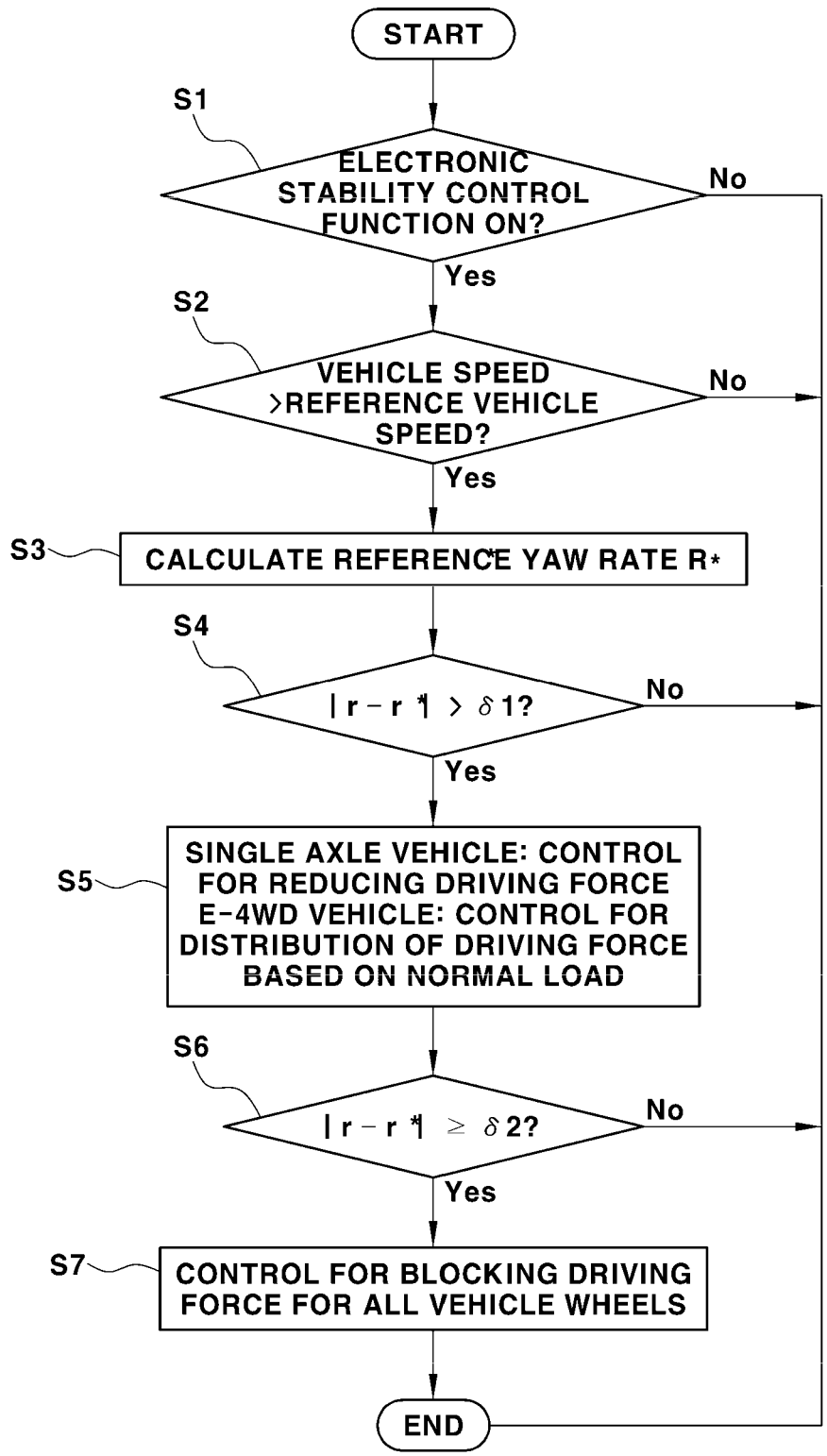
FIG. 2 is a flowchart illustrating an electronic stability control method of a vehicle according to an embodiment of the present disclosure.

FIG. 2 is a flowchart illustrating an electronic stability control method of a vehicle according to an embodiment of the present disclosure and illustrates a yaw rate-based electronic stability control method.

The electronic stability control procedure according to the present disclosure may be performed by a plurality of controllers that perform cooperative control, but may be performed by one integrated control device, and hereinafter, the plurality of controllers or the one integrated control device that performs the electronic stability control procedure according to the present disclosure may be collectively referred to as a 'controller'.

The electronic stability control for a vehicle according to the present disclosure may be operated only when being selected by a driver, and as described above, when the driver turns on the electronic stability control function through the input unit 15, the controller 20 may determine the electronic stability control function to be turned on (S1) and may perform subsequent procedures for the electronic stability control for a vehicle.

The subsequent procedures will now be described in detail. In the state in which the electronic stability control function is turned on, the controller 20 may determine whether a vehicle speed condition set to prevent a malfunction, in which a current vehicle speed detected by the vehicle speed sensor 12 is a low speed, is satisfied (S2).

The controller 20 may set the vehicle speed condition for preventing a malfunction of a low speed as a condition in which the current vehicle speed is greater than a preset reference vehicle speed, and thus the controller 20 may determine that the vehicle speed condition is satisfied when the current vehicle speed detected by the vehicle speed sensor 12 is greater than the reference vehicle speed.

Then, in the yaw rate-based electronic stability control procedure, when the vehicle speed condition is satisfied, the controller 20 may calculate a reference yaw rate r* using vehicle state information detected by the detector 10 (S3), and in this case, the vehicle state information may include the current vehicle speed detected by the vehicle speed sensor 12, and a steering angle detected by the steering angle sensor 11.

The controller 20 may calculate the reference yaw rate r* using the Equation 1 below.

$$r^* = \frac{V_x}{1 + (V_x/V_{char})^2} \times \frac{\delta_f}{L} \qquad \text{[Equation 1]}$$

Here, $V_x$ is the current vehicle speed (longitudinal-direction vehicle speed), $V_{char}$ is a characteristic vehicle speed determined as a constant, $\delta_f$ is a steering angle, and L is a wheelbase between a front wheel and a rear wheel.

Thereamong, the characteristic vehicle speed $V_{char}$ and the wheelbase L between the front wheel and the rear wheel may be unique vehicle setting information that is preset in the controller 20.

As described above, in operation S3, when the reference yaw rate r* is calculated, the controller 20 may calculate yaw rate error |r-r*| that is a difference value between the reference yaw rate r* and the yaw rate y detected by the yaw rate sensor 13 among the vehicle state information detected by the detector 10, and may compare the calculated yaw rate error |r-r*| with a first error reference value δ1 (S4).

Here, the yaw rate error may be defined as an absolute value |r-r*| that is a difference value between the detected yaw rate 'r' and the reference yaw rate r* and may be a value indicating a real-time driving state of the vehicle, that is, a vehicle state value.

The controller 20 may determine the first error reference value δ1 as a value corresponding to the current vehicle speed detected by vehicle speed sensor 12, and to this end, setting data for defining a relationship between the vehicle speed and the first error reference value δ1 may be used.

Here, the setting data may be used to pre-input and stored in the controller 20 and may include a map or a table, a line diagram, or a mathematical expression.

Figure 3:
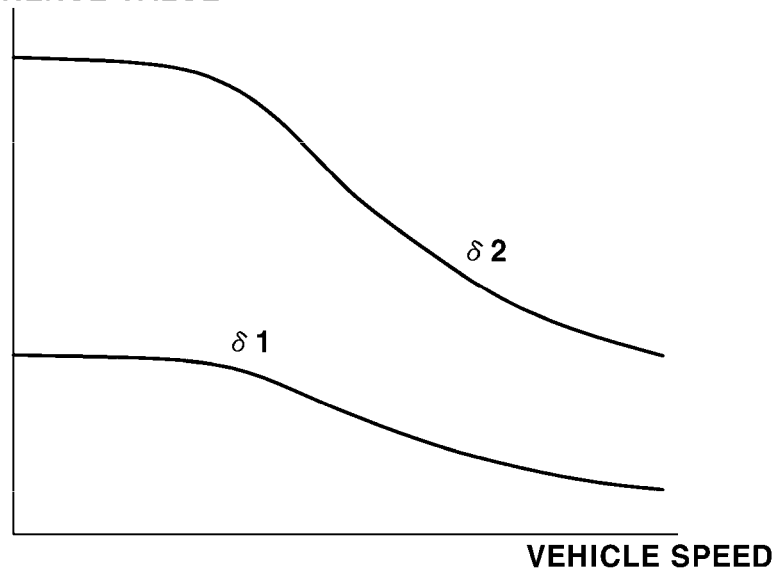
FIG. 3 is a diagram illustrating an example in which an error reference value is set to a value based on a vehicle speed according to the present disclosure.

FIG. 3 is a diagram illustrating an example in which an error reference value is set to a value based on a vehicle speed according to the present disclosure.

According to the present disclosure, two error reference values may be used, and in this regard, a second error reference value δ2 that will be described below may be used along with the first error reference value δ1, and both the first error reference value δ1 and the second error reference value δ2 may be set to a positive value.

The controller 20 may set the first error reference value δ1 to a smaller value than the second error reference value δ2 (refer to FIG. 3).

The controller 20 may also determine the second error reference value δ2 as a value corresponding to the current vehicle speed detected by the vehicle speed sensor 12 like the first error reference value δ1 (refer to FIG. 3), and to this end, setting data for defining a relationship between the vehicle speed and the second error reference value δ2 may be used.

As described above, the first error reference value δ1 and the second error reference value δ2 are set using a function of a vehicle speed, and as a vehicle speed is increased, a degree of risk is increased, and thus as the vehicle speed is increased, the first error reference value δ1 and the second error reference value δ2 may be set to be gradually reduced.

Then, as the comparison result, when the yaw rate error |r-r*| is greater than the first error reference value δ1, the controller 20 may perform control to reduce driving force of the driving device 31 based on the yaw rate error |r-r*| (S5).

According to the present disclosure, control for reducing driving force may be control for manipulation of driving force for preventing oversteer or understeer with respect to driving force generated by a driving device, and the control may include a procedure of correcting a general driving force command determined from driving information of a vehicle to be reduced by the controller 20.

In this case, the controller 20 may be configured to correct the driving force command based on the yaw rate error |r-r*|, and in this case, may correct the driving force command based on the yaw rate error in a period in which the yaw rate error is greater than the first error reference value δ1.

In detail, the controller 20 may be configured to correct the driving force command to be reduced in proportion to a value by which the yaw rate error |r-r*| is greater than the first error reference value δ1.

That is, the driving force of the driving device 31 may be reduced in proportion to the value by which the yaw rate error |r-r*| is greater than the first error reference value δ1.

To this end, when the controller 20 determines a correction coefficient corresponding to the yaw rate error |r-r*| and determines a general driving force command based on driving information collected from the vehicle, the controller 20 may be configured to correct the driving force command using the determined correction coefficient.

In this case, the correction coefficient may be set to a value greater than 0 and smaller than 1, and setting data defined by setting the correction coefficient as a value based on the yaw rate error |r-r*| may be input and stored in the controller 20 and may be used.

As such, when determining the correction coefficient corresponding to the yaw rate error |r-r*|, the controller 20 may apply the correction coefficient to correct the driving force command, and in this case, may calculate a final driving force command using a value obtained by multiplying the driving force command determined based on the driving information with the correction coefficient.

Figure 4:
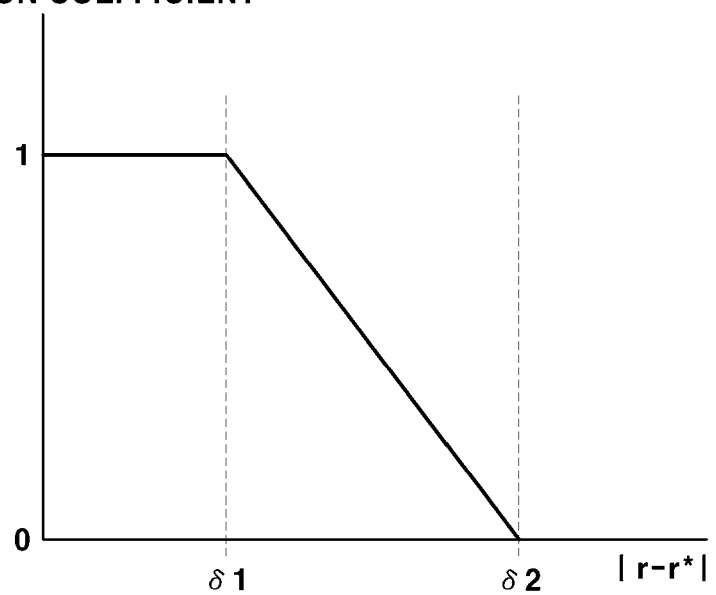
FIG. 4 is a diagram illustrating an example of setting of a correction coefficient for correcting a driving force command according to an embodiment of the present disclosure.

FIG. 4 is a diagram illustrating an example of setting of a correction coefficient for correcting a driving force command according to an embodiment of the present disclosure and illustrates an example of setting data defined by setting a correction coefficient based on the yaw rate error |r-r*| from the first error reference value δ1 to the second error reference value δ2.

Referring to FIG. 4, a correction coefficient is set to 1 in a period in which the yaw rate error |r-r*| is equal to or less than the first error reference value δ1, and in this case, the correction coefficient being 1 means that the driving force command is not corrected.

Referring to FIG. 4, a correction coefficient is set to 0 in a period in which the yaw rate error is equal to or greater than the second error reference value δ2, and in this case, the correction coefficient being 0 means that the corrected final driving force command is 0.

According to the present disclosure, when the yaw rate error |r-r*| is equal to or greater than the second error reference value δ2, the controller 20 may perform control to block application of driving force of the driving device 31 to all vehicle wheels.

Adjustment of driving force may be control in such a way that the controller 20 outputs a driving force command of 0 and the driving device 31 does not generate driving force (a driving device may not be driven), or alternatively, may mean that power transfer between the driving device 31 and each vehicle wheel is instrumentally blocked through the power transfer device 32 in such a way that driving force of the driving device 31 is not transferred to all axles of the driving force and all vehicle wheels.

As such, when the yaw rate error |r-r*| is equal to or greater than a preset second error reference value δ2, the controller 20 may perform control to block application of driving force to all axles and the vehicle wheel.

As seen from FIG. 4, a correction coefficient may be 1 when the yaw rate error |r-r*| is the first error reference value δ1, and a correction coefficient may be 0 when the yaw rate error is the second error reference value δ2, and in a period in which the yaw rate error is greater than the first error reference value δ1 and is smaller than the second error reference value δ2, as a yaw rate error value is increased, the correction coefficient is linearly and gradually reduced.

According to the present disclosure, as described above, the controller 20 may set a correction coefficient defined as a value of 0 to 1 to correct a driving force command, but the correction coefficient may also be set to a value converted into percentage, but not 0 to 1, and in this case, the percentage refers to a ratio of driving force maintained after correction to general driving force determined based on the driving information.

Referring back to FIG. 2, when the yaw rate error |r-r*| is greater than the first error reference value δ1, in the case of a single axle vehicle having one driving device 31, the controller 20 may correct the driving force command based on the yaw rate error |r-r*| as described above (S5).

The controller 20 may determine a correction coefficient corresponding to the yaw rate error |r-r*| from the setting data shown in FIG. 4 and may then correct the driving force command by multiplying the general driving force command determined based on the driving information of the vehicle with the correction coefficient.

Thus, the controller 20 may finally output the corrected driving force command and may control driving of the driving device 31 according to the corrected final driving force command output by the controller 20 to reduce the driving force generated and output by the driving device 31.

When the yaw rate error |r-r*| is greater than the first error reference value δ1, if the vehicle is an e-4WD vehicle, the controller 20 may terminate distribution of the driving force between the front wheel and the rear wheel of the vehicle and may perform distribution based on normal load (S5).

That is, a vehicle having an e-4WD system is capable of controlling both torque of the front wheel and torque of the rear wheel, and thus simple driving force may be reduced in a period in which the yaw rate error |r-r*| is greater than the first error reference value δ1, driving force may be distributed with a ratio proportional to the amplitude of normal load of each of the front wheel and the rear wheel.

For example, when a ratio of normal load of the front wheel and normal load of the rear wheel is 7:3, a front wheel driving device and a rear wheel driving device may be controlled to distribute driving force (torque) of 70% of total driving force required for driving to the front wheel and to distribute driving force (torque) of 30% of the total driving force to the rear wheel.

Here, normal load of each vehicle wheel may be detected by a sensor or the like of the vehicle or may be estimated using information detected by the sensor or the like.

Such normal load of each vehicle wheel may be a known control parameter that has been widely used to control a vehicle, and a detailed description of a calculation method thereof is omitted here.

As such, like control of reduction of driving force in the single axle vehicle, control of distribution of driving force with respect to the front wheel and the rear wheel may also refer to control for adjustment of driving force for preventing oversteer or understeer.

Then, when the yaw rate error |r-r*| is greater than the first error reference value δ1 and the yaw rate error |r-r*| is equal to or greater than the second error reference value δ2 in operation S6, the controller 20 may perform control to block driving force between the driving device 31 and the vehicle wheel in such a way that driving force of the driving device 31 is not transferred to all vehicle wheels as described above in operation S7 of FIG. 2.

Figure 5:
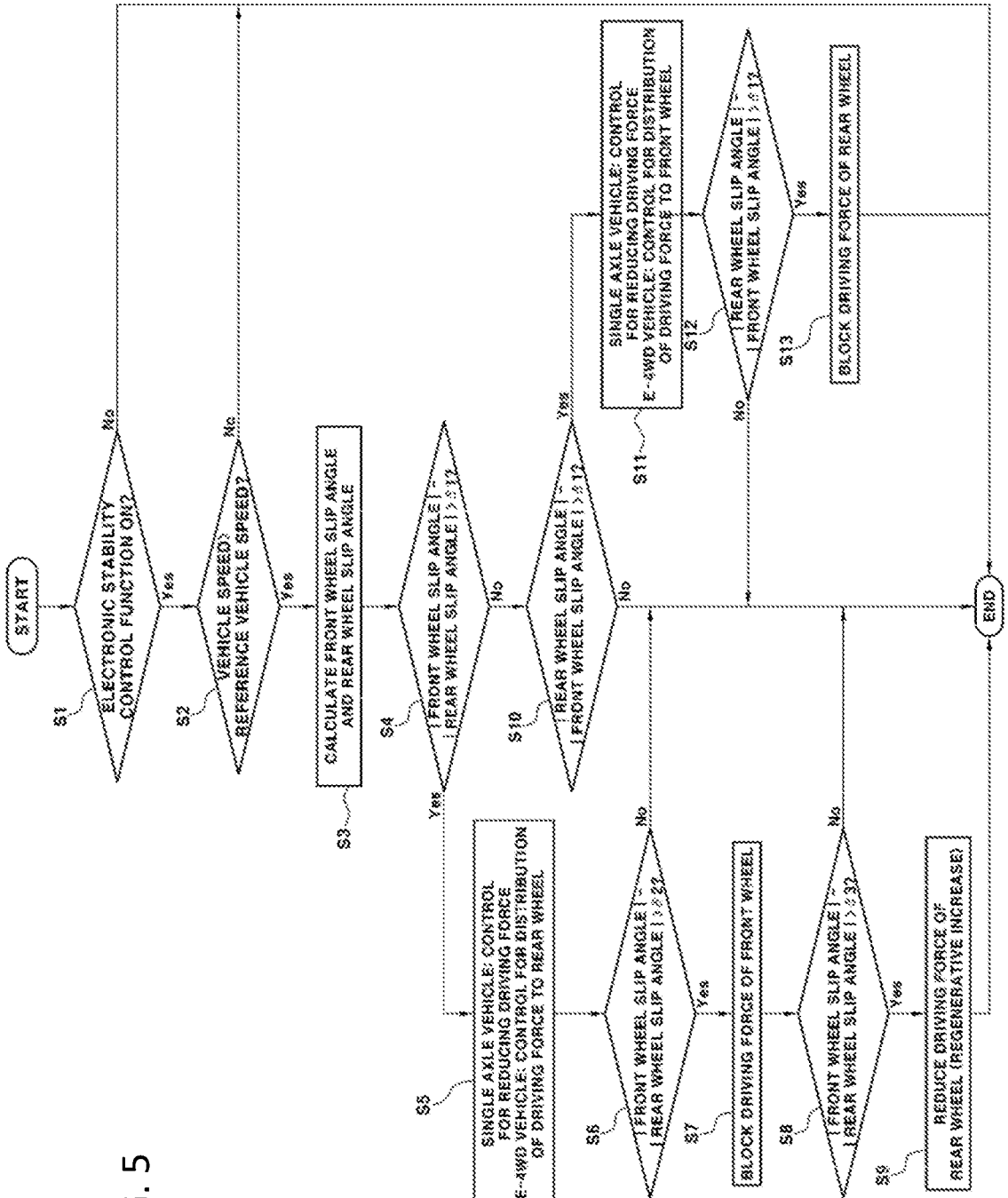
FIG. 5 is a flowchart illustrating an electronic stability control method for a vehicle according to another embodiment of the present disclosure.

FIG. 5 is a flowchart illustrating an electronic stability control method for a vehicle according to another embodiment of the present disclosure and illustrates a slip angle-based electronic stability control method.

Compared with FIG. 2 the slip angle-based electronic stability control method uses a slip angle instead of a yaw rate, and a difference between (i.e., a slip angle difference value) between the front wheel slip angle and the rear wheel slip angle may be used instead of yaw rate error as a vehicle state value indicating a real-time driving state of the vehicle.

In FIG. 5, δ1 and δ2 are a first error reference value and a second error reference value, respectively, and in the following description of the embodiment of FIG. 5, although the first error reference value and the second error reference value are used, the first error reference value δ1 and the second error reference value δ2 of FIG. 5 are a reference value for a slip angle difference value, and thus may be set to different values from δ1 and δ2 of FIG. 2 that are reference values of the yaw rate error.

As shown in FIG. 5, the slip angle-based electronic stability control function may also be operated only when being selected by the driver, and when the driver turns on the electronic stability control function through the input unit 15, the controller 20 may determine that the electronic stability control function is in an on-state (S11) and may perform subsequent procedures, and thus the slip angle-based electronic stability control procedure may be performed.

That is, in the on-state of the electronic stability control function, the controller 20 may determine whether the current vehicle speed detected by the vehicle speed sensor 12 satisfies a vehicle speed condition for preventing a malfunction at a low speed (S12), and may determine that the vehicle speed condition is satisfied when the current vehicle speed is greater than a preset reference vehicle speed.

Then, in the slip angle-based electronic stability control procedure, when the vehicle speed condition is satisfied, the controller 20 may calculate a front wheel slip angle $\alpha_f$ and a rear wheel slip angle $\alpha_r$ using the vehicle state information detected by the detector 10.

Here, the vehicle state information may include a current vehicle speed detected by the vehicle speed sensor 12, a steering angle detected by the steering angle sensor 11, a yaw rate detected by the yaw rate sensor 13, and a lateral acceleration detected by the acceleration sensor 14.

According to the present disclosure, in order to calculate a front wheel slip angle and a rear wheel slip angle, a lateral slip angle needs to be calculated, and the lateral slip angle is a well-known control parameter that has been already used to control a vehicle, and thus a detailed description of a method or procedure of calculating the lateral slip angle is omitted here.

In a simple example, a method of estimating a lateral slip angle using a lateral-direction vehicle speed detected by a sensor in the vehicle, a method of determining a lateral-direction vehicle speed using the yaw rate and lateral acceleration detected by the user in the vehicle and estimating a lateral slip angle from the lateral-direction vehicle speed, or the like may be used.

In order to estimate the lateral slip angle, when the lateral-direction speed detected by the sensor is used, the detector 10 among components of the apparatus of FIG. 1 may further include a sensor for detecting a lateral-direction speed.

In addition, it may be possible to use a lateral slip angle estimating apparatus disclosed in Korean Patent Publication No. 10-2017-0047042 (May 4, 2017), or to use a lateral slip angle estimating method disclosed in Korean Patent No. 10-1626163 (May 25, 2016).

Equations 2 and 3 below may represent calculation of the front wheel slip angle $\alpha_f$ and the rear wheel slip angle $\alpha_r$, respectively, and the controller 20 may calculate the front wheel slip angle $\alpha_f$ and the rear wheel slip angle $\alpha_r$ using Equations 2 and 3 below.

$$\alpha_f = \beta + \frac{l_f}{V_x} r - \delta_f \qquad \text{[Equation 2]}$$

$$\alpha_r = \beta - \frac{l_r}{V_x} r \qquad \text{[Equation 3]}$$

Here, $\alpha_f$ is a front wheel slip angle, $\alpha_r$ is a rear wheel slip angle, and $\beta$ is a lateral slip angle.

$V_x$ is the current vehicle speed (longitudinal-direction vehicle speed), r is a yaw rate, and $\delta_f$ is a steering angle.

In addition, $l_f$ is a distance between the center of gravity of the vehicle and a front wheel axis, $l_r$ is a distance between the center of gravity of the vehicle and a rear wheel axis, and $l_f$ and $l_r$ are unique vehicle setting information that is pre-input to the controller 20 and is used.

As described above, the front wheel slip angle $\alpha_f$ and the rear wheel slip angle $\alpha_r$ may be calculated using the vehicle speed $V_x$, the yaw rate 'r', and the steering angle $\delta_f$, and more detail, may be calculated using the lateral slip angle $\beta$ described along with the vehicle speed $V_x$, the yaw rate 'r', and the steering angle $\delta_f$ detected by sensors of the detector 10.

Referring back to FIG. 5, after the front wheel slip angle and the rear wheel slip angle are calculated in operation S3, the controller 20 may compare a slip angle difference value obtained by subtracting an absolute value of the rear wheel slip angle $\alpha_r$ from an absolute value of the front wheel slip angle $\alpha_f$ with a preset first error reference value $\delta1$ (S4).

Here, when the slip angle difference value obtained by subtracting the absolute value of the rear wheel slip angle from the absolute value of the front wheel slip angle is greater than the first error reference value $\delta1$, the controller 20 may determine that the current situation is a situation in which understeer may occur and may control driving force of operation S5 for preventing understeer.

In contrast, when the slip angle difference value obtained by subtracting the absolute value of the rear wheel slip angle from the absolute value of the front wheel slip angle is equal to or less than the first error reference value $\delta1$, the controller 20 may determine that the slip angle difference value obtained by oppositely subtracting the absolute value of the front wheel slip angle from the absolute value of the rear wheel slip angle with the first error reference value $\delta1$ in operation S10.

Here, when the slip angle difference value obtained by subtracting the absolute value of the front wheel slip angle from the absolute value of the rear wheel slip angle is greater than the first error reference value $\delta1$, the controller 20 may determine that the current situation is a situation in which oversteer may occur and may control driving force of operation S11 for preventing oversteer.

In the case of the single axle vehicle, like in the aforementioned embodiment of FIG. 2, in operation S5, control for reducing driving force may be performed with respect to the driving device 31, and in this regard, in the embodiment of FIG. 2, the driving force command may be corrected based on the yaw rate error for controlling of driving force reduction, but in the embodiment of FIG. 5, the driving force command may be corrected based on the slip angle difference value for controlling of driving force reduction.

Here, the slip angle different value may be a value obtained by subtracting the absolute value of the rear wheel slip angle from the absolute value of the front wheel slip angle, that is, an understeer slip angle error, and the controller 20 may determine a correction coefficient corresponding to the slip angle difference value (understeer slip angle error) from the setting data and may then correct the driving force command by multiplying the driving force command determined based on the driving information of the vehicle with the correction coefficient.

Thus, the controller 20 may finally output the corrected driving force command, and may control an operation of the driving device 31 according to the corrected final driving force command output from the controller 20 to reduce driving force generated and output by the driving device 31, thereby preventing understeer of the vehicle.

The setting data used to determine the correction coefficient from the slip angle difference value by the controller 20 may be set to a value obtained by setting the correction coefficient to a corresponding value according to the slip angle difference value, and may be pre-stored and used in the controller 20.

In this case, the setting data used to determine the correction coefficient from the slip angle difference value may be similar to the setting data of FIG. 4 used to determine the correction coefficient from the yaw rate error.

That is, the setting data used to determine the correction coefficient from the slip angle difference value may be obtained by replacing the yaw rate error with the slip angle difference value in the setting data of FIG. 4.

The correction coefficient may be set to a value greater than 0 and smaller than 1, and the setting data obtained by setting the correction coefficient to a value based on the slip angle difference value may be pre-stored and used in the controller 20.

As described above, after determining the correction coefficient corresponding to the slip angle difference value, the controller 20 may apply the correction coefficient to correct the driving force command, and as described above, may correct the driving force command by multiplying the general driving force command determined based on the driving information with the correction coefficient.

The correction coefficient corresponding to the yaw rate error has been described in detail before with reference to FIG. 4, and thus when the yaw rate error is replaced with the slip angle difference value in the above description of FIG. 4, the correction coefficient corresponding to the slip angle difference value may be easily understood by one of ordinary skill in the art.

When the slip angle difference value is greater than the first error reference value $\delta1$, if the vehicle is an e-4WD vehicle, the controller 20 may control driving of the driving device 31 of the front wheel and the driving device 31 of the rear wheel to distribute driving force (torque) to the rear wheel in operation S5.

According to an embodiment of the present disclosure, when the slip angle difference value is greater than the first error reference value $\delta1$ and is smaller than the second error reference value $\delta2$, in the case of understeer, front wheel torque may be reduced, and in this case, a torque amount by which the front wheel torque is reduced may be added to the current rear wheel torque.

In this case, the torque amount by which the front wheel torque is reduced, that is, the torque amount that is additionally distributed to the rear wheel may be determined as a value being proportional to the slip angle difference value, or may be calculated by a map from the slip angle difference value.

When the vehicle is a single axle vehicle, the slip angle difference value (understeer slip angle error) is greater than the first error reference value $\delta1$, and also, when the slip angle difference value is equal to or greater than the second error reference value $\delta2$ in operation S6 of FIG. 5, the controller 20 may perform control for blocking driving force between the driving device 31 and all vehicle wheels in such a way that driving force of the driving device 31 is not transferred to the all vehicle wheels in operation S7 of FIG. 5, like in the embodiment of FIG. 2.

However, when the vehicle is an e-4WD vehicle, the slip angle difference value is greater than the first error reference value $\delta1$, and also, when the slip angle difference value is equal to or greater than the second error reference value $\delta2$ in operation S6, the controller 20 may perform control for blocking driving force with respect to the front wheel in such a way that driving force of the driving device 31 is not transferred to the front wheel in operation S7.

In this case, driving force blocking with respect to the front wheel may refer to control in which the controller 20 outputs the driving force command to the driving device 31 of the front wheel as 0 and the driving device 31 of the front wheel does not generate driving force (front wheel driving device may not be driven), or alternatively, may mean that power transfer between the driving device 31 of the front wheel and the front wheel is instrumentally blocked through the power transfer device 32 in such a way that driving force of the driving device 31 of the front wheel is not transferred to the front wheel.

Compared with driving force blocking all the vehicle wheels described in the embodiment of FIG. 2, driving force blocking with respect to the front wheel is different therefrom in that the front wheel of the e-4WD vehicle is a target but not the all vehicle wheels but is not different therefrom in terms of a method or device for driving force blocking with respect to the vehicle wheel.

Then, in operation S8, when the slip angle difference value is greater than a third error reference value δ3, the controller 20 may control the driving device 31 of the rear wheel to perform regenerative brake in the state in which the driving device 31 of the rear wheel and the rear wheel are instrumentally connected (S9), thereby ensuring driving stability of the vehicle.

In this case, for example, when original rear wheel torque is 100 as positive driving torque, the original rear wheel torque may be reduced to 70 (driving force of the rear wheel is reduced), and when the original rear wheel torque is −50 as negative regenerative torque, the original rear wheel torque may be reduced to −80 (absolute value of regenerative brake of the rear wheel is increased).

In the case of the single axle vehicle, when the slip angle difference value is greater than the third error reference value δ3, the controller 20 may control the driving device 31 to perform regenerative brake in the state in which the driving device 31 and the vehicle wheel (driving wheel) are instrumentally connected to each other.

As described above, in operation S4, when it is determined that the value obtained by subtracting an absolute value of the rear wheel slip angle from an absolute value of the front wheel slip angle is equal to or less than the first error reference value δ1, the slip angle difference value obtained by subtracting the absolute value of the front wheel slip angle from the absolute value of the rear wheel slip angle may be compared with the first error reference value δ1 in operation S10.

Here, when the slip angle difference value obtained by subtracting the absolute value of the front wheel slip angle from the absolute value of the rear wheel slip angle is greater than the first error reference value δ1, driving force control in operation S11 for preventing oversteer may be performed.

In operation S11, control for reducing driving force with respect to the driving device 31 may also be performed in the case of a single axle vehicle, and like in operation S5, the driving force command may be corrected based on the slip angle difference value for control for reducing driving force.

However, the slip angle difference value for correcting the driving force command in control for reducing driving force in operation S11 may be a value obtained by subtracting an absolute value of the front wheel slip angle from an absolute value of the rear wheel slip angle, that is, an oversteer slip angle error, oppositely from operation S5.

Compared with control for reducing driving force in operation S5, control for reducing driving force in operation S11 may be different therefrom in that the slip angle difference value (oversteer slip angle error) obtained by subtracting the absolute value of the front wheel slip angle from the absolute value of the rear wheel slip angle is used, and the remaining part except for this is not different therefrom, and thus a detailed description thereof is omitted here.

In operation S10, when the slip angle difference value (oversteer slip angle error) is greater than the first error reference value δ1, if the vehicle is an e-4WD vehicle, in operation S11, the controller 20 may control driving of the driving device 31 of the front wheel and the driving device 31 of the rear wheel to distribute driving force (torque) to the front wheel.

According to an embodiment of the present disclosure, when the slip angle difference value is greater than the first error reference value δ1 and is equal to or less than the second error reference value δ2, in the case of oversteer, when rear wheel torque may be reduced, and in this case, a torque amount by which the rear wheel torque is reduced may be added to the current front wheel torque.

In this case, the torque amount by which the rear wheel torque is reduced, that is, the torque amount that is additionally distributed to the front wheel may be determined as a value being proportional to the slip angle difference value, or may be calculated by a map from the slip angle difference value.

When the vehicle is a single axle vehicle, the slip angle difference value (oversteer slip angle error) is greater than the first error reference value δ1 in operation S10, and also, when the slip angle difference value is equal to or greater than the second error reference value δ2 in operation S12, the controller 20 may perform control for blocking driving force between the driving device 31 and the vehicle wheel in such a way that driving force of the driving device 31 is not transferred to the all vehicle wheels in operation S13 of FIG. 5.

When the vehicle is an e-4WD vehicle, the slip angle difference value (oversteer slip angle error) is greater than the first error reference value δ1 in operation S10, and also, when the slip angle difference value is equal to or greater than the second error reference value δ2 in operation S12, the controller 20 may perform control for blocking driving force with respect to the rear wheel in such a way that driving force of the driving device 31 is not transferred to the rear wheel in operation S13 of FIG. 5.

In this case, compared with driving force blocking with respect to the front wheel, the driving force blocking with respect to the rear wheel is different therefrom in that the rear wheel and the driving device 31 of the rear wheel are a target but is not different therefrom in terms of a method or device therefor.

When driving force is blocked with respect to the rear wheel, driving force may be increased with respect to the front wheel, and an acceleration that is not intended by the driver may be likely to be momentarily generated in oversteer control, and thus driving force increase with respect to the front wheel may be selectively performed.

As such, the slip angle-based electronic stability control procedure has been described before with reference to FIG. 5 and needs to define a slip angle, and thus there is a limit in terms of application of the slip angle-based electronic stability control procedure, but it may be advantageous that understeer and oversteer may be differentiated and may be reacted instead of simple stability.

As described above, in the slip angle-based electronic stability control procedure, three error reference values of the first error reference value δ1, the second error reference value δ2, and the third error reference value δ3 may be used and all the three error reference values are set to positive values, and in this case, the second error reference value δ2 may be set to be greater than the first error reference value δ1, and the third error reference value δ3 may be set to be greater than the second error reference value δ2.

The controller 20 may determine each error reference value as a value corresponding to the current vehicle speed, and to this end, the first error reference value δ1, the second error reference value δ2, and the third error reference value δ3 may be set to setting data for setting a value based on a vehicle speed may be pre-input and may be used in the controller 20.

In this case, as the vehicle speed is increased, all of the first error reference value δ1, the second error reference value δ2, and the third error reference value δ3 may be set to be gradually reduced.

Accordingly, when the electronic stability control method for a vehicle according to the present disclosure is used, electronic stability control for a vehicle may be performed simply by adjusting driving force and braking power that are generated by a driving device of the vehicle without use of a driving force distributing method between front, rear, left, or right vehicle wheels.

As a result, electronic stability control for a vehicle may be performed without an increase in device costs for introducing a distributing apparatus while preventing degradation of driving efficiency due to frictional brake.

The present disclosure has been described in detail with reference to preferred embodiments thereof. However, it will be appreciated by those skilled in the art that changes may be made in these embodiments without departing from the principles and spirit of the present disclosure, the scope of which is defined in the appended claims and their equivalents.

What is claimed is:

1. An electronic stability control method for a vehicle, wherein the vehicle is a vehicle including one driving device installed therein, or the vehicle is a 4-wheel drive vehicle having a front wheel driving device and a rear wheel driving device, the method comprising:
    collecting information for determining a vehicle state value while the vehicle travels, by a controller of the vehicle;
    determining the vehicle state value indicating a driving state of the vehicle from the collected information, by the controller;
    comparing the determined vehicle state value with a first reference value, by the controller; and
    when the vehicle state value is greater than the first reference value, controlling an operation of a driving device for generating driving force for driving the vehicle and adjusting driving force for preventing understeer or oversteer of the vehicle, by the controller,
    wherein the vehicle state value is a yaw rate error or is a slip angle difference value between a front wheel and a rear wheel; and
    wherein the first reference value is a first error reference value determined by a current vehicle speed by the controller,
    wherein, when the vehicle is a vehicle including one driving device installed therein, the adjusting the driving force includes:
        determining a correction coefficient corresponding to the yaw rate error, by the controller;
        correcting a driving force command determined from driving information of the vehicle using the determined correction coefficient, by the controller; and
        outputting the corrected driving force command and controlling an operation of the driving device according to the corrected driving force command, by the controller.

2. The method of claim 1, wherein the controller performs each operation of the collecting, the determining, the comparing, and the controlling for electronic stability control for the vehicle according to a signal of an input unit when a driver turns on an electronic stability control function through the input unit.

3. The method of claim 1, wherein the controller compares the current vehicle speed with a preset reference vehicle speed, and performs subsequent operations including the determining the vehicle state value when determining that the current vehicle speed is greater than the reference vehicle speed.

4. The method of claim 1, wherein the vehicle state value is a yaw rate error;
    wherein, when the vehicle is a vehicle including one driving device installed therein for applying driving force to the front wheel or the rear wheel, the adjusting the driving force includes reducing driving force generated by the driving device based on the yaw rate error by the controller; and
    wherein, when the vehicle is a 4-wheel drive vehicle having a front wheel driving device and a rear wheel driving device, the adjusting the driving force includes performing distribution of driving force distributed to the front wheel and the rear wheel according to a ratio of normal lad load of the front wheel and normal load of the rear wheel, by the controller.

5. The method of claim 4, wherein, when the vehicle is a vehicle including one driving device installed therein, the adjusting the driving force includes reducing driving force of the driving device in proportion to an amount by which the yaw rate error is greater than the first error reference value, by the controller.

6. The method of claim 1, wherein the correction coefficient is preset to a value greater than 0 and smaller than 1 in the controller, and is set to a value that is gradually reduced as the yaw rate error is increased.

7. The method of claim 4, further comprising:
    comparing the yaw rate error with a second error reference value determined from the current vehicle speed, by the controller; and
    when the yaw rate error is equal to or greater than the second error reference value, performing control to not apply driving force to all vehicle wheels of the vehicle, by the controller.

8. The method of claim 1, wherein the vehicle state value is a slip angle difference value between the front wheel and the rear wheel; and
    wherein the controller determines a front wheel slip angle and a rear wheel slip angle from the information collected from the vehicle and then determines a value obtained by subtracting an absolute value of the rear wheel slip angle from an absolute value of the front wheel slip angle, as the slip angle difference value.

9. The method of claim 8, wherein, when the slip angle difference value is greater than a first error reference value, if the vehicle is a vehicle including one driving device installed therein for applying driving force to the front wheel or the rear wheel, the adjusting the driving force includes reducing driving force generated by the driving device based on the slip angle difference value, by the controller; and
    wherein, when the vehicle is a 4-wheel drive vehicle having a front wheel driving device and a rear wheel driving device, the adjusting the driving force includes reducing front wheel torque and performing additional distribution on rear wheel torque by a reduced amount of the front wheel torque.

10. The method of claim 9, wherein, when the vehicle is a vehicle including one driving device installed therein, the adjusting the driving force includes reducing driving force of the driving device in proportion to an amount by which the slip angle difference value is greater than the first error reference value, by the controller.

11. The method of claim 9, wherein, when the vehicle is a vehicle including one driving device installed therein, the adjusting the driving force includes:
    determining a correction coefficient corresponding to the slip angle difference value, by the controller;
    correcting the driving force command determined from the driving information of the vehicle using the determined correction coefficient, by the controller; and
    outputting the corrected driving force command and controlling an operation of the driving device according to the corrected driving force command, by the controller.

12. The method of claim 11, wherein the correction coefficient is preset to a value greater than 0 and smaller than 1 in the controller, and is set to a value that is gradually reduced as the slip angle difference value is increased.

13. The method of claim 9, further comprising:
    comparing the slip angle difference value with a second error reference value determined from the current vehicle speed, by the controller; and
    when the slip angle difference value is equal to or greater than the second error reference value, performing control not to apply driving force to a driving wheel by the controller if the vehicle is a vehicle including one driving device installed therein, and performing control to not apply driving force to the front wheel by the controller if the vehicle is a 4-wheel drive vehicle.

14. The method of claim 13, further comprising:
    comparing the slip angle difference value with a third error reference value determined from a current vehicle speed, by the controller; and
    when the slip angle difference value is greater than the third error reference value, controlling a driving device to perform regenerative braking by the controller when the vehicle is a device including one driving device installed therein, and controlling a rear wheel driving device to perform regenerative braking when the vehicle is a 4-wheel drive vehicle.

15. The method of claim 8, comprising:
    when the slip angle difference value is equal to or less than a first error reference value, comparing a slip angle difference value obtained by subtracting an absolute value of a front wheel slip angle from an absolute value of a rear wheel slip angle with the first error reference value, by the controller; and
    when the slip angle difference value obtained by subtracting the absolute value of the front wheel slip angle from the absolute value of the rear wheel slip angle is greater than the first error reference value, controlling an operation of a driving device for generating driving force for driving the vehicle and adjusting driving force for preventing oversteer of the vehicle, by the controller.

16. The method of claim 15, wherein the adjusting the driving force for preventing oversteer of the vehicle includes:
    performing control for reducing driving force generated by the driving device based on the slip angle difference value obtained by subtracting the absolute value of the front wheel slip angle from the absolute value of the rear wheel slip angle by the controller in the adjusting the driving force when the vehicle is a vehicle including one driving device installed therein for applying driving force to the front wheel or the rear wheel; and
    reducing rear wheel torque and performing additional distribution on front wheel torque by a reduced amount of rear wheel torque, by the controller in the adjusting the driving force, when the vehicle is a 4-wheel drive vehicle including a front wheel driving device and a rear wheel driving device.

17. The method of claim 16, wherein, when the vehicle is a vehicle including one driving device installed therein, the adjusting the driving force includes reducing driving force of the driving device in proportion to an amount by which the slip angle difference value obtained by subtracting the absolute value of the front wheel slip angle from the absolute value of the rear wheel slip angle is greater than the first error reference value.

18. The method of claim 17, wherein, when the vehicle is a vehicle including one driving device installed therein, the adjusting the driving force includes:
    determining a correction coefficient corresponding to the yaw rate error, by the controller;
    correcting a driving force command determined from driving information of the vehicle using the determined correction coefficient, by the controller; and
    outputting the corrected driving force command and controlling an operation of the driving device according to the corrected driving force command, by the controller.

19. The method of claim 15, further comprising:
    comparing the slip angle difference value obtained by subtracting the absolute value of the front wheel slip angle from the absolute value of the rear wheel slip angle with a second error reference value by the controller; and
    when the slip angle difference value obtained by subtracting the absolute value of the front wheel slip angle from the absolute value of the rear wheel slip angle is equal to or greater than the second error reference value, if the vehicle is a vehicle including one driving device installed therein, performing control not to not apply driving force to a driving wheel and performing control to not apply driving force to the rear wheel when the vehicle is a 4-wheel drive vehicle, by the controller.

* * * * *